June 6, 1933.  H. MASBRUCH  1,912,534
ANIMAL BLINDER
Filed July 19, 1932
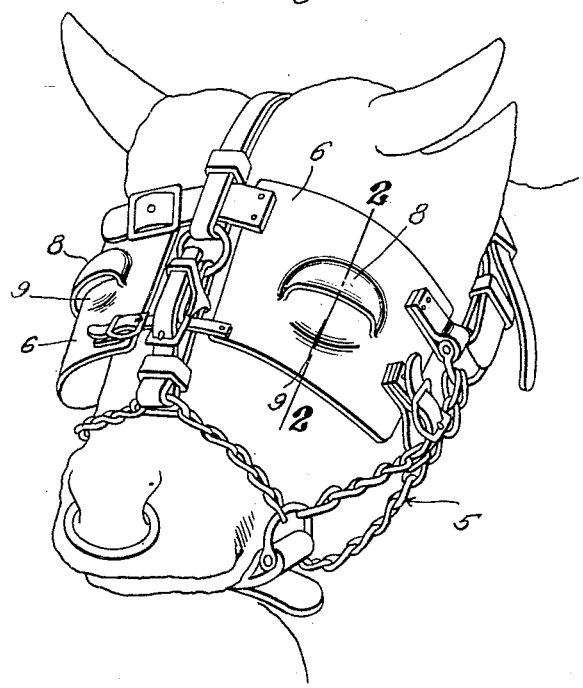
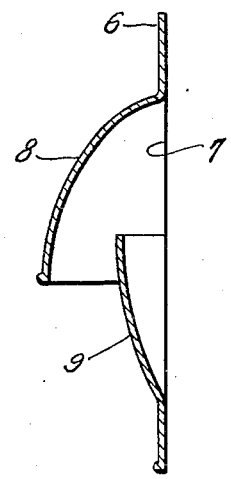
Inventor
Henry Masbruch,
By Clarence A. O'Brien
Attorney Patented June 6, 1933

1,912,534

UNITED STATES PATENT OFFICE

HENRY MASBRUCH, OF PLATTEVILLE, WISCONSIN

ANIMAL BLINDER

Application filed July 19, 1932. Serial No. 623,434.

This invention appertains to new and useful improvements in blinders for animals, and is an improvement on my co-pending application, Serial No. 584,534, filed January 2, 1932, with the same title.

An important object of the present invention is to provide a blinder constructed in such a manner as to greatly reduce the cost of manufacture.

Another important object of the invention is to provide a blinder for animals which in use will be efficient and durable, efficient to the extent that the animal using the same, such as a bull, will not be able to see in advance of himself when his head is lowered.

These and various other important objects and advantages of the invention will become apparent to the reader of the following specification.

In the drawing:

Figure 1 represents a perspective view of the device installed on a bull's head.

Figure 2 represents a vertical sectional view through one of the eye plates taken substantially along line 2—2, of Fig. 1.

Referring to the drawing, wherein like numerals designate like parts, it can be seen that the numeral 5 generally refers to the harness such as is described and claimed in my co-pending application Serial No. 584,534.

In carrying out the present invention, a pair of plates 6—6 are employed, each of which is of arcuate shape and each has a circular opening 7 therein.

From the upper edge portion of the opening 7 depends a semi-circular concavo-convexo shaped shade 8 which terminates below a diametrical line drawn horizontally across the opening 7.

Extending upwardly from the lower edge portion of the opening 7 is the upwardly extending shade 9 of semicircular concavo-convexo shape, the latter shade being substantially less in depth than the shade 8 so that these shades interlap in spaced relation in the manner substantially shown in Figure 2.

Obviously, with this construction the animal can see downwardly when his head is in normal erect position and obviously it would be necessary for the animal to throw his head backwardly to an unusually abnormal position before he could see on a horizontal plane.

Obviously the device serves as an efficient blinder for animals, particularly bulls which are fractious and have a tendency to charge anything which comes within their view.

While the foregoing specification sets forth the invention in specific terms, it is to be understood that numerous changes in the shape, size, and materials may be resorted to without departing from the spirit and scope of the invention claimed hereinafter.

I claim:

1. A blinder for animals comprising a pair of eye plates each having a sight opening therein, a semi-circular concavo-convexo shaped shade on each plate depending a substantial distance over the said sight opening, and an upwardly extending shade in the said opening extending upwardly above the lower edge of the depending shade so that a normal line of vision between the opposed edges of the shades must be downwardly.

2. A blinder for animals comprising a plate having a sight opening therein, a shade on the plate extending downwardly over a part of the said opening, and a second shade on the plate extending upwardly over the opening and in spaced interlapping relation with respect to the first-mentioned shade so that a normal line of vision between the opposed edges of the shades must be downwardly.

In testimony whereof I affix my signature.

HENRY MASBRUCH.